US006658516B2

(12) United States Patent
Yao

(10) Patent No.: US 6,658,516 B2
(45) Date of Patent: *Dec. 2, 2003

(54) MULTI-INTERFACE MEMORY CARD AND ADAPTER MODULE FOR THE SAME

(76) Inventor: Li-Ho Yao, No. 99-4, Tungan St., Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/546,920

(22) Filed: Apr. 11, 2000

(65) Prior Publication Data

US 2003/0172219 A1 Sep. 11, 2003

(51) Int. Cl.[7] .......................... G06F 13/00; H01R 25/00; H05K 7/00
(52) U.S. Cl. ......................... 710/301; 710/74; 710/305; 710/2; 711/115; 439/638; 439/76.1; 439/945; 361/684
(58) Field of Search ................................ 710/62–74, 2, 710/100, 300–304, 305; 711/115; 439/638–655, 76.1, 945, 946; 361/679–686

(56) References Cited

U.S. PATENT DOCUMENTS

| 5,644,790 | A | * | 7/1997 | Li et al. ........................ 710/63 |
| 5,663,901 | A | * | 9/1997 | Wallace et al. ........ 365/185.11 |
| 5,752,857 | A | * | 5/1998 | Knights ....................... 439/638 |
| 5,815,426 | A | * | 9/1998 | Jigour et al. .................. 365/51 |
| 5,909,596 | A | * | 6/1999 | Mizuta ......................... 710/63 |
| 5,920,731 | A | * | 7/1999 | Pletl et al. .................... 710/14 |
| 5,928,347 | A | * | 7/1999 | Jones ......................... 348/222 |
| 6,006,295 | A | * | 12/1999 | Jones et al. .................. 710/62 |
| 6,088,755 | A | * | 7/2000 | Kobayashi et al. ......... 710/300 |
| 6,292,863 | B1 | * | 9/2001 | Terasaki et al. ............ 710/100 |
| 6,314,479 | B1 | * | 11/2001 | Frederick et al. ............. 710/63 |
| 6,385,667 | B1 | * | 5/2002 | Estakhri et al. ............. 710/313 |
| 6,385,677 | B1 | * | 5/2002 | Yao ............................ 711/115 |
| 6,434,648 | B1 | * | 8/2002 | Assour et al. .............. 710/305 |
| 6,524,137 | B1 | * | 2/2003 | Liu et al. .................... 439/638 |

* cited by examiner

Primary Examiner—Sumati Lefkowitz
(74) Attorney, Agent, or Firm—Kolisch Hartwell, P.C.

(57) ABSTRACT

A multi-interface memory card and an adapter module for the memory card are described to enable convenient transfer of data between the memory card and a computer. The multi-interface memory card has a micro controller, a memory unit, a USB interface, an IEEE 1394 interface, and a product interface. The memory unit is connected to the micro controller, such that external computers or electronic products can read data from or write data to said memory unit under the control of the micro controller. The USB and IEEE 1394 interfaces are connected to the memory unit via the micro controller for controlling data access. The product interface is provided for connecting to a digital product to read or write data. The adapter module is provided to conveniently connect the multi-interface memory card to the computer.

9 Claims, 5 Drawing Sheets

MULTI-INTERFACE MEMORY CARD AND ADAPTER MODULE FOR THE SAME

BACKGROUND OF THE INVENTION

1. Field of the Invention

The present invention relates to a multi-interface memory card and an adapter module; more particularly, the present invention relates to a memory card with multiple kinds of interfaces to communicate with an electronic product and a computer, respectively, for convenient data access, and an adapter module for such a multi-interface memory card.

2. Description of Related Art

Digital devices, such as electronic dictionaries, electronic translators, digital cameras, etc., are in widespread use today. The use of these digital devices requires storing of data in storage media, and generally memory cards are provided for such a purpose. As well known to those skilled in the art, various kinds of memory cards, such as the STONE card, Smart Media card, MMC card, Memory Stick card and Compact Flash card, have been provided with the advantages of compactness and large storage capacity, typically, more than several mega-bytes. The use of such memory cards enables the miniaturization of digital products. However, they do not have standard interfaces for communicating with a computer. Therefore, it is inconvenient to use a computer to read data from the memory card. Some of the existing methods to transfer data between a computer and a memory card are as follows:

1. Using a card reader: A card reader is provided to connect to an interface port of a computer such that the computer is able to read data from a memory card that is inserted in the card reader. As different memory cards have different interfaces, a dedicated card reader must be provided for a specific memory card.

2. Using a transform disk: A transform disk that has the same physical specification as the 3.5-inch disk is provided with a slot for receiving a memory card, such that a computer can write data to or read data from the memory card when the transform disk is inserted into the disk drive of the computer.

There are several problems encountered in using the aforementioned methods. For example, most of the card readers can not write data to the memory cards, and the data access speed is slow when the transform disk and disk drive are used for transferring data between a memory card and a computer. Furthermore, the use of a transform disk and disk drive to read or write data is likely to result in mechanical disorders because data is accessed by physical contact.

Moreover, the interface port provided for a computer generally depends on the requirement of the computer, and may vary according to the development of the computer industry. For example, the USB, port and IEEE 1394 interfaces have been introduced recently to provide high speed and large capacity interfacing capabilities. Clearly, if a memory card is to be used with computers with respective different interfaces, different kinds of card readers or transform devices are required, and thus it is obvious that the use of the memory card is inconvenient.

To solve the aforementioned problems, a memory card is provided in a pending U.S. patent application Ser. No. 09/449,961 entitled "Dual interface memory card and adapter module for the same." Although this pending patent may effectively eliminate the drawbacks in using the card reader or transform disk, it is deemed unsatisfactory as the memory card only has one kind of interface, e.g. the USB port, to communicate with the computer. Therefore, a novel memory card that can mitigate and/or obviate the problems is desired.

SUMMARY OF THE INVENTION

The object of the present invention is to provide a multi-interface memory card and an adapter module for the memory card to conveniently transfer data between the memory card and a computer without the risk of mechanical disorders.

In accordance with one aspect of the present invention, a multi-interface memory card is provided, which includes: a micro controller; a memory unit connected to the micro controller, such that external computers or electronic products can read data from or write data to said memory unit under the control of the micro controller; multiple connection interfaces connected to the memory unit via the micro controller for controlling data access, the connection interfaces conforming to different interface specifications; and a product interface for connecting to a digital product to read or write data.

In accordance with another aspect of the present invention, an adapter module is provided for a multi-interface memory card having a front end formed thereon with an interface port for providing multiple connection interfaces and a product interface. The adapter module includes: a housing defining a slot for receiving the memory card; multiple interface connectors held in the housing and adapted for connecting to corresponding interface ports of a computer; and a terminal seat held in the housing, the terminal seat having a plurality of connection terminals, each having one end for facing to the interface port of the memory card, and another end connected to the multiple interface connectors.

In accordance with a further aspect of the present invention, a multi-interface memory card is provided, which includes: a micro controller; a memory unit connected to the micro controller, such that external computers or electronic products can read data from or write data to said memory unit under the control of the micro controller; a connection interface connected to the memory unit via the micro controller for controlling data access, the connection interface conforming to an IEEE 1394 interface-specification; and a product interface for connecting to a digital product to read or write data.

In accordance with a still further aspect of the present invention, an adapter module is provided for a multi-interface memory card having a front end formed thereon with an interface port for providing an IEEE 1394 interface and a host interface. The adapter module includes: a housing defining a slot for receiving the memory card; an IEEE 1394 interface connector held in the housing and adapted for connecting to a corresponding interface port of a computer; and a terminal seat held in the housing, the terminal seat having a plurality of connection terminals, each having one end for facing to the interface port of the memory card, and another end connected to the IEEE 1394 interface connector.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
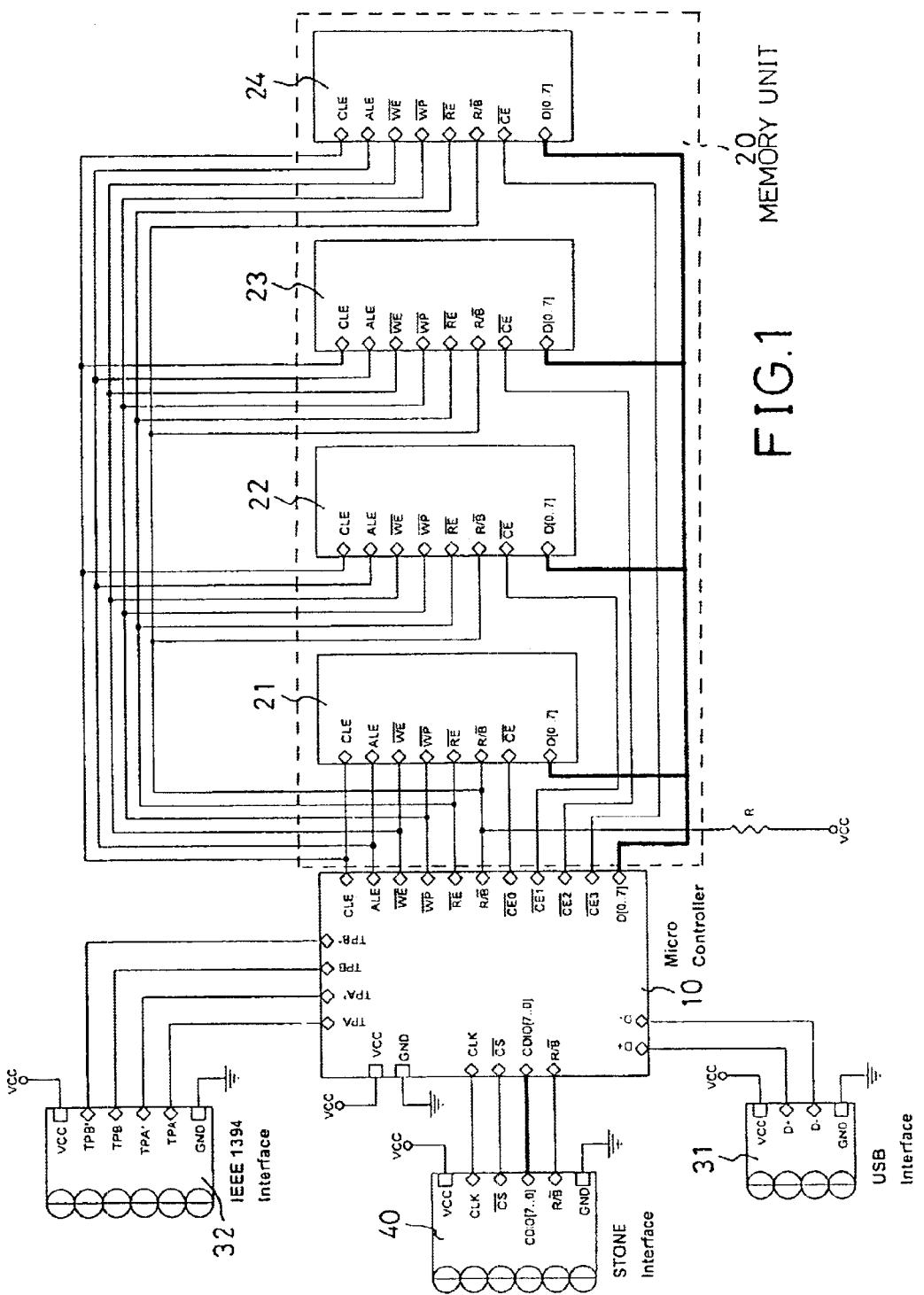
FIG. 1 is the circuit diagram of a multi-interface memory card in accordance with a first preferred embodiment of the present invention.

FIG. 1 shows a circuit structure of a multi-interface memory card in accordance with the present invention, which includes a micro controller (10), a memory unit (20), one or more connection interfaces (31, 32), and a product interface (40). The memory unit (20) is connected to the micro controller (10) via an address bus and a data bus, such that external computers or electronic products can read data from or write data to the memory unit (20) under the control of the micro controller (10). The connection interfaces (31, 32) are provided to connect to the memory unit (20) via the micro controller (10) for data access. The product interface (40) is provided to connect to a digital product, such as a digital camera, to read or write data. The micro controller (10) executes software to perform a data conversion operation to convert data read from an external product and store the converted data in desired memory locations in the memory unit (20). Furthermore, when the memory card is connected to a computer, the micro controller (10) can read data from the memory (20) and convert the data for transfer to the computer via a corresponding interface.

Figure 2:
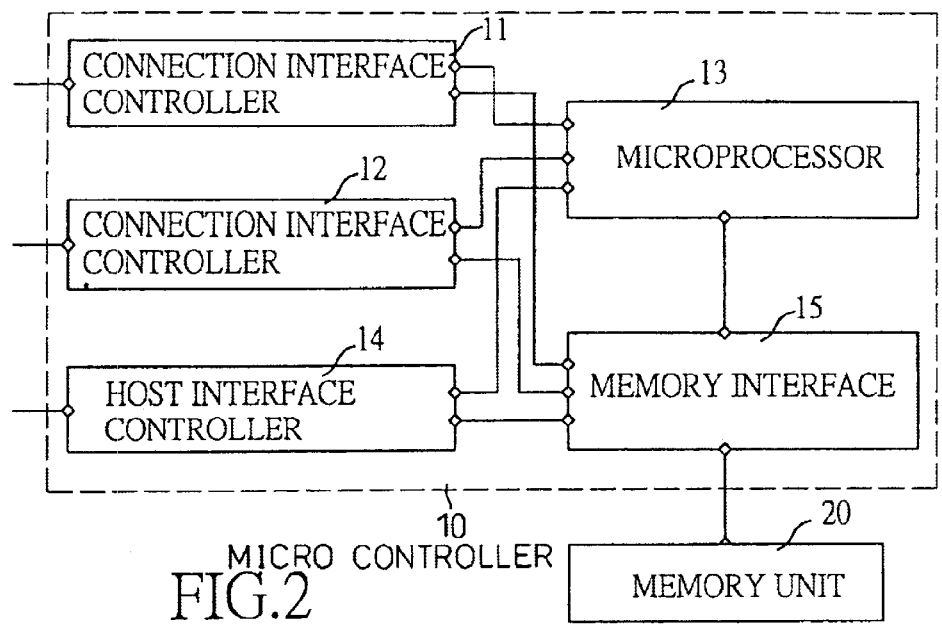
FIG. 2 is a block diagram of the micro controller shown in FIG. 1.

FIG. 2 shows the structure of the micro controller (10), which includes a microprocessor (13), a memory interface (15), multiple connection interface controllers (11, 12), and a host interface controller (14). The connection interface controllers (11, 12) are connected to the microprocessor (13) and the external connection interfaces (31, 32). The host interface controller (14) is connected to the microprocessor (13) and the external product interface (40). The memory interface (12) is connected to the microprocessor (13), the connection interface controllers (11, 12), and the host interface controller (14).

In this preferred embodiment, the micro controller (10) is provided with two connection interface controllers (11, 12); one is a USB interface controller and the other one is an IEEE 1394 interface controller.

The host interface controller (14) is preferred to conform to the specification of a STONE card for connecting to the external product interface (40). With reference to FIG. 1, the memory unit (20) is composed of flash memory, random access memory or read only memory chips. In this preferred embodiment, the memory unit (20) is composed of four flash memory chips (21~24) connected together via the bus and also connected to the micro controller (10).

In this preferred embodiment, there are two connection interfaces (31, 32); one is a USB interface and the other is an IEEE 1394 interface for connecting to the two connection interface controllers (11, 12), respectively.

The product interface (40) is preferred to conform to the specification of the STONE card for connecting to the host interface controller (14).

When the memory card is installed in a product and electrically connected to the product via the product interface (40), the data output of the product is transferred to the memory card via the product interface (40), and processed by the micro controller (10) for being stored in the memory unit (20).

With such a design, the memory card can be placed in a product for recording data and writing the stored data to a computer via different interfaces or read data from a computer.

Figure 3:
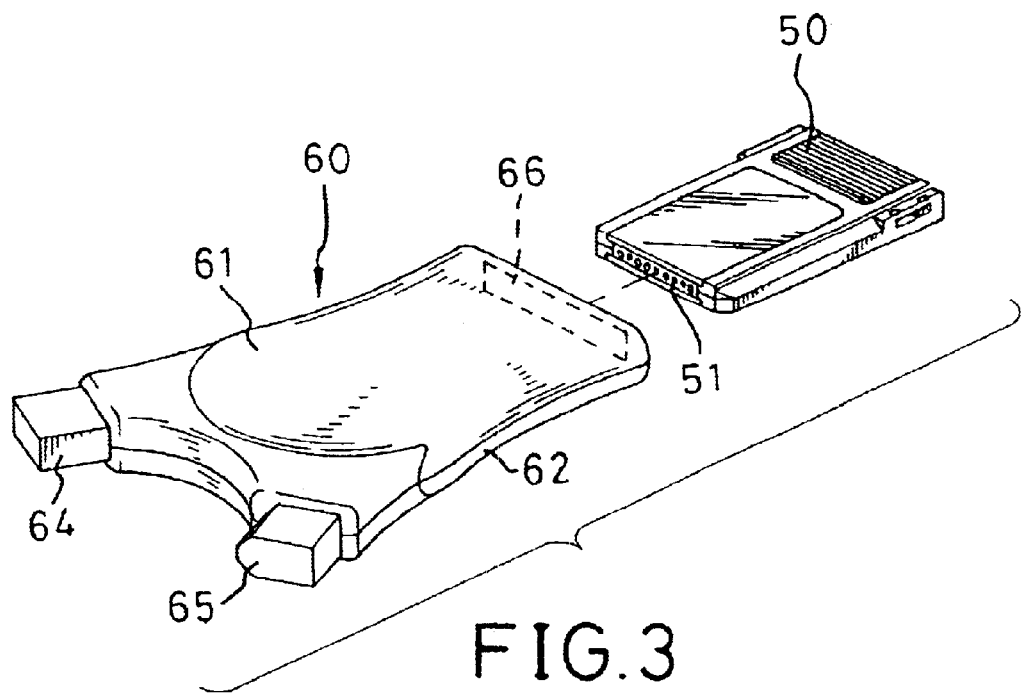
FIG. 3 is a perspective view of the memory card and an adapter module in accordance with the first preferred embodiment of the present invention.

A practical implementation of the memory card in accordance with the present invention is shown in FIG. 3 for illustrative purpose. It is shown that a memory card (50) is in use with an adapter module (60), wherein the memory card (50) has the aforementioned micro controller (10), memory unit (20), and multiple interfaces. Furthermore, a front end of the memory card (50) is provided with an interface port (51) having a plurality of terminal holes. Four of the terminal holes are provided as the USB interface, while the others are provided as the IEEE 1394 interface and the product interface. In order to connect the memory card (50) to different interface ports of a computer, the adapter module (60) is employed, the internal structure of which is shown in FIG. 4.

Figure 4:
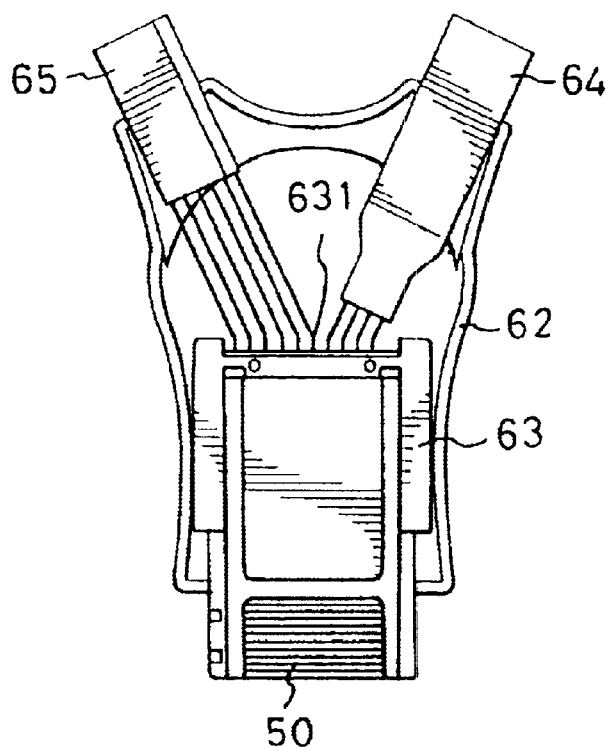
FIG. 4 is a cross sectional view of the adapter module being inserted with the multi-interface memory card in accordance with the first preferred embodiment of the present invention.

With reference to FIG. 3 and FIG. 4, the adapter module (60) has an upper shell (61) and a lower shell (62) for combining with the upper shell (61) to form a housing, in which a terminal seat (63) is provided at one end of the housing, and a USB connector (64) and an IEEE 1394 connector (65) are provided at an opposite end of the housing.

The upper shell (61) and the lower shell (62) can be secured together by screw means or other appropriate securing means. Each of the upper shell (61) and lower shell (62) defines an opening at a first end thereof, thereby forming a slot (66) for receiving the memory card (50). A second end of each of the upper shell (61) and lower shell (62) has a Y-shape and defines two openings, thereby forming two slots for receiving the USB connector (64) and IEEE 1394 connector (65).

The terminal seat (63) is substantially an H-shaped body which has two parallel rims and a rib extending between the two rims. Each of the rims defines a sliding slot (not shown) in an inner side thereof, such that the memory card (50) can smoothly slide into the terminal seat (63). A plurality of connection terminals (631) is extended through the rib. Each connection terminal (631) has one end for facing to the interface port (51) of the memory card (50), and another end connected to the USB connector (64) and IEEE 1394 connector (65). Therefore, when the memory card (50) is inserted into the adapter module (60), the interface port (51) of the memory card (50) receives the connection terminals (631) of the terminal seat (63), such that the interface port (51) is electrically connected to the USB connector (64) and the IEEE 1394 connector (65) via the plurality of connection terminals (631).

Figure 5:
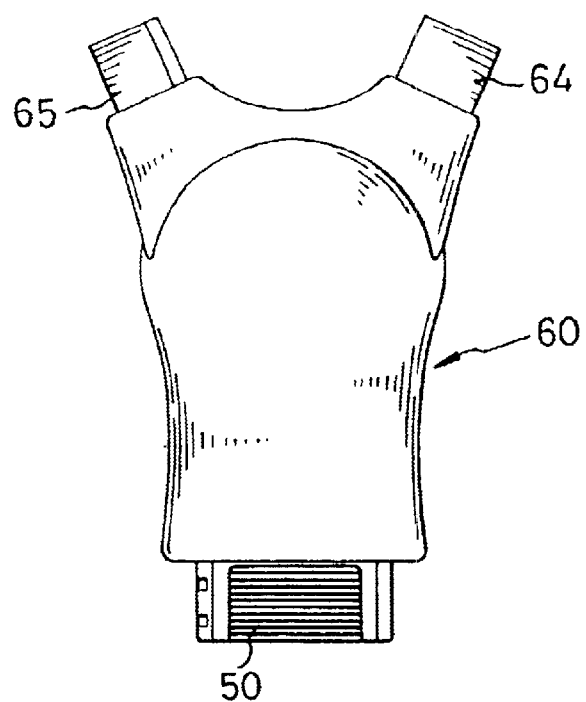
FIG. 5 is a plane view of the adapter module being inserted with the multi-interface memory card in accordance with the first preferred embodiment of the present invention.

After the memory card (50) is combined with the adapter module (60), as shown in FIG. 5, it can be plugged to the interface port of a computer via the USB connector (64) or the IEEE 1394 connector (65). The memory card (50) in the adapter module (60) is thus electrically connected to the computer. Because the memory card (50) is directly connected to the computer via a high speed interface, the data transfer between the memory card (50) and the computer is fast. Accordingly, the computer can read data from or write data to the memory card (50) in a fast and convenient manner.

In addition to directly inserting the adapter module (60) into the interface port of a computer, the adapter module (60) can be inserted into the slot of a hub that is further connected to the computer.

Figure 6:
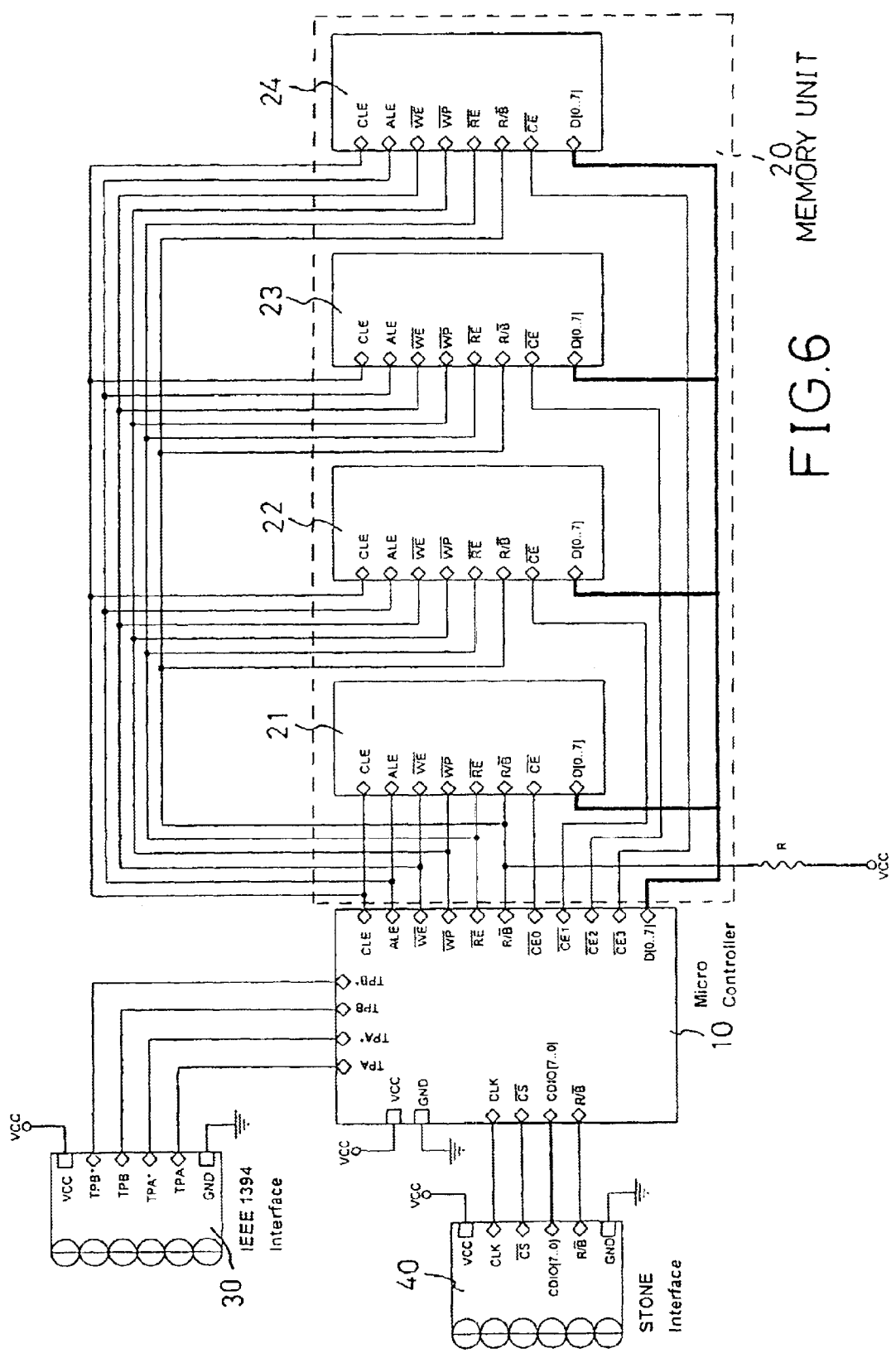
FIG. 6 is the circuit diagram of a multi-interface memory card in accordance with a second preferred embodiment of the present invention.

FIG. 6 is a circuit diagram of another preferred embodiment in accordance with the present invention, which differs from the previous embodiment in that the memory card is provided with only a connection interface (30) and a product interface (40). The connection interface (30) and product interface (40) are connected to the memory unit (20) via the micro controller (10).

Figure 7:
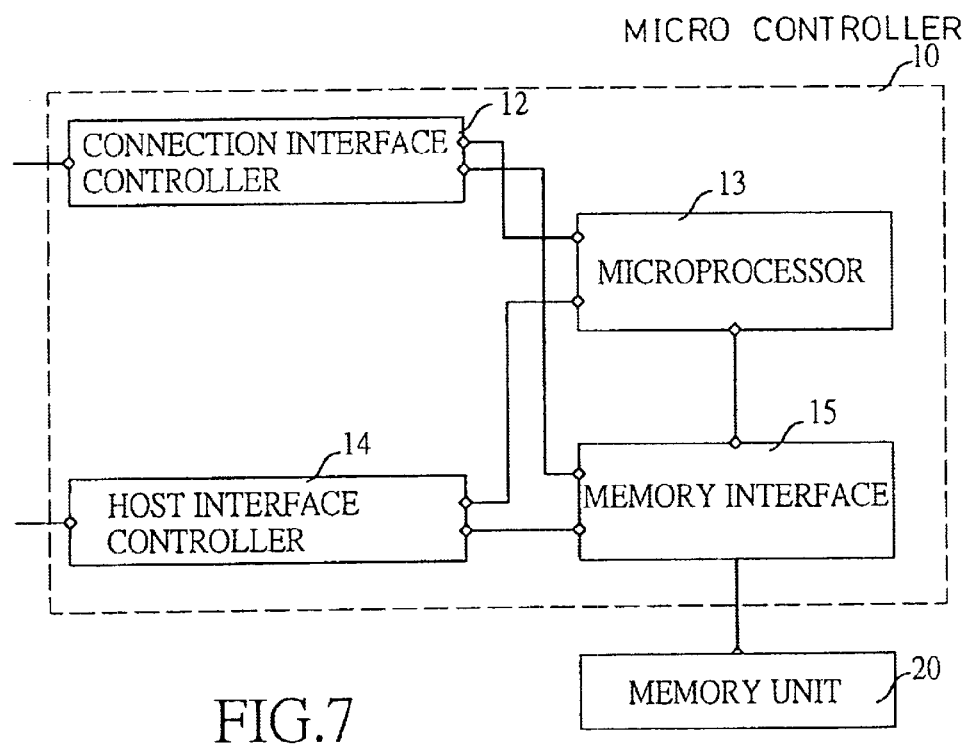
FIG. 7 is a block diagram of the micro controller shown in FIG. 6.

FIG. 7 shows the structure of the micro controller (10), which includes a microprocessor (13), a memory interface (15), an IEEE 1394 interface controller (12), and a host interface controller (14). The IEEE 1394 interface controller (12) is connected to the connection interface (30). The host interface controller (14) is connected to the product interface (40).

Figure 8:
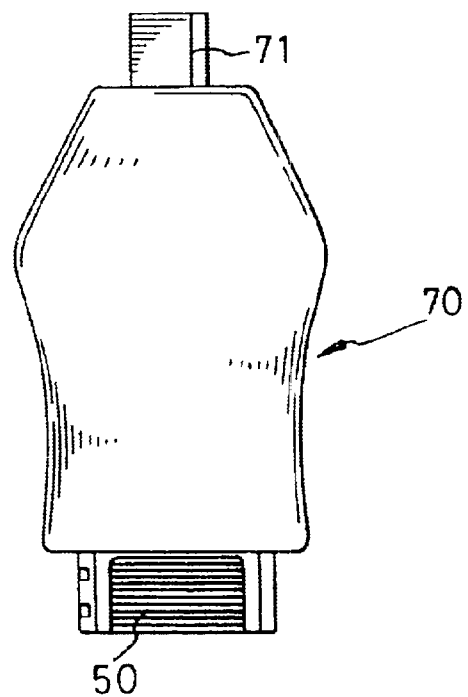
FIG. 8 is a plane view of the adapter module being inserted with the multi-interface memory card in accordance with the second preferred embodiment of the present invention.

As a result, the memory card can be placed in a product for recording data, or connected to the IEEE 1394 interface port of a computer via an adapter module. As shown in FIG. 8, the adapter module (70) is the same as that of the previous embodiment except that only one IEEE 1394 connector (71) is provided for connecting the memory card (50) in the adapter module (70) to the IEEE 1394 interface port of the computer.

The above description depicts the multi-interface memory card and the adapter module in accordance with the present invention. It is appreciated that such a design can be applied to the existing STONE card, Smart Media card, MMC card, Memory Stick card, Compact Flash card, and the like. Consequently, it is convenient to use a computer to read data from or write data to different kinds of memory cards.

Although the present invention has been explained in relation to its preferred embodiment, it is to be understood that many other possible modifications and variations can be made without departing from the spirit and scope of the invention as hereinafter claimed.

What is claimed is:

1. A memory card in combination with an adapter module, wherein the memory card comprises:
   a micro controller;
   a memory unit connected to the micro controller to store data;
   multiple connection interfaces connected to the memory unit via the micro controller for data access in the memory unit; and
   a product interface for connection with a digital product;
   wherein the adapter module comprises:
   a housing alternatively and slidably receiving the memory card therein;
   multiple interface connectors formed on the housing and adapted for connection to interface ports of a computer; and
   a terminal seat formed in the housing, the terminal seat being composed of a plurality of connection terminals, wherein each connection terminal has a first and a second end, the first end to electrically connect to the connection interfaces and the product interface of the memory card, and the second end connected to the multiple interface connectors of the adapter module;
   whereby when the memory card is installed in the digital product via the product interface, data output from the digital product is transferred to the memory card through the product interface and processed by the micro controller to be stored in the memory unit; and
   after the memory card is combined with the adapter module, the adapter module is adapted to plug into an interface port of the computer via one of the multiple interface connectors so that the computer is able to read data stored in the memory card.

2. The memory card in combination with the adapter module as claimed in claim 1, wherein the micro controller of the multi interface memory card comprises:
   a microprocessor;
   multiple connection interface controllers connected to the microprocessor and correspondingly connected to the multiple connection interfaces;
   a host interface controller connected between the product interface and the microprocessor; and
   a memory interface connected to the microprocessor, the multiple connection interface controllers, the host interface controller, and the memory unit.

3. The memory card in combination with the adapter module as claimed in claim 2, wherein the housing of the adapter module is comprises an upper shell and a lower shell, wherein each of the upper shell and lower shell has a first end defined with an opening, so that a first slot to receive the memory card is defined by the two openings when the upper shell and the lower shell are combined; and
   wherein second slots are defined via second ends of the upper shell and lower shell after the upper and the lower shell are combined so that the multiple interface connectors are able to be received in the second slots.

4. The memory card in combination with the adapter module as claimed in claim 2, wherein the terminal seat includes an H-shaped body that has two parallel rims and a rib extending between the two rims, each rim defining a sliding slot in an inner side of the rim to alternatively and slidably receive therein the memory card, and the plurality of connection terminals is extended through the rib to connect to the multiple interface connectors.

5. The memory card in combination with the adapter module as claimed in claim 3, wherein the terminal seat includes an H-shaped body that has two parallel rims and a rib extending between the two rims, each rim defining a sliding slot in an inner side of the rim, and the plurality of connection terminals extends through the rib to connect to the multiple interface connectors.

6. The memory card in combination with the adapter module as claimed in claim 4, wherein the multiple connection interfaces of the memory card include a Universal Serial Bus (USB) interface and an Institute of Electrical and Electronic Engineers 1394 (IEEE 1394) interface.

7. The memory card in combination with the adapter module as claimed in claim 5, wherein the multiple connection interfaces of the memory card include a USB interface and an IEEE 1394 interface.

8. The memory card in combination with the adapter module as claimed in claim 6, wherein a front end of the memory card is provided with an interface port to electrically connect to the terminal seat of the adapter module, and the interface port has a plurality of terminal holes; wherein four of the terminal holes are provided as the USB interface and the others are provided as the IEEE 1394 and the product interface.

9. The memory card in combination with the adapter module as claimed in claim 7, wherein a front end of the memory card is provided with an interface port to electrically connect to the terminal seat of the adapter module, and the interface port has a plurality of terminal holes; wherein four of the terminal holes are provided as the USB interface and the others are provided as the IEEE 1394 and the product interface.

* * * * *